United States Patent
Dickman et al.

(10) Patent No.: US 11,605,158 B2
(45) Date of Patent: Mar. 14, 2023

(54) SYSTEM AND METHOD FOR EARLY IDENTIFICATION AND MONITORING OF DEFECTS IN TRANSPORTATION INFRASTRUCTURE

(71) Applicant: Dynamic Infrastructure Ltd., Kfar Monash (IL)

(72) Inventors: Saar Dickman, Burgata (IL); Amichay Cohen, Zur Moshe (IL)

(73) Assignee: DYNAMIC INFRASTRUCTURE LTD., Kfar Monash (IL)

( * ) Notice: Subject to any disclaimer, the term of this patent is extended or adjusted under 35 U.S.C. 154(b) by 77 days.

(21) Appl. No.: 17/045,176

(22) PCT Filed: Apr. 2, 2019

(86) PCT No.: PCT/IL2019/050381
§ 371 (c)(1),
(2) Date: Oct. 4, 2020

(87) PCT Pub. No.: WO2019/193592
PCT Pub. Date: Oct. 10, 2019

(65) Prior Publication Data
US 2021/0150692 A1  May 20, 2021

Related U.S. Application Data

(60) Provisional application No. 62/761,734, filed on Apr. 5, 2018.

(51) Int. Cl.
*G06T 7/00* (2017.01)
*G06K 9/62* (2022.01)
*G06V 10/44* (2022.01)

(52) U.S. Cl.
CPC .......... *G06T 7/0002* (2013.01); *G06K 9/6215* (2013.01); *G06K 9/6227* (2013.01);
(Continued)

(58) Field of Classification Search
CPC ......... G06T 7/0002; G06T 2207/20084; G06T 2207/30184; G06T 2207/30232;
(Continued)

(56) References Cited

U.S. PATENT DOCUMENTS 9,129,355 B1   9/2015 Harvey et al.
2005/0249414 A1  11/2005 Uehara et al.
(Continued)

FOREIGN PATENT DOCUMENTS

CN   108053132 A   5/2018
KR   101604050 B   3/2016

OTHER PUBLICATIONS

Chen, Z. and Hutchinson, T.C., 2010. Image-based framework for concrete surface crack monitoring and quantification. Advances in Civil Engineering, 2010.*
(Continued)

*Primary Examiner* — Zhitong Chen
(74) *Attorney, Agent, or Firm* — The Roy Gross Law Firm, LLC; Roy Gross

(57) ABSTRACT

The invention relates to a system and method for monitoring a structural vulnerability not yet apparent as a defect. A type of vulnerability is identified from a grouping of elements and/or features of a structure and its systems, called findings, whose attributes meet a particular set of selection rules called relationship-association classifiers (RACs)—a series of one or more tests of relationships between attributes of findings, the series of tests indicating whether findings are associated and collectively classified as a particular type of vulnerability or defect. A RAC may be established by an optimization function or a neural network function, trained from maintenance reports and documented findings and attributes concurrent with each maintenance report. Findings are identified and attributes evaluated from one or more
(Continued)

- ACCUMULATING IMAGES OF A STRUCTURE — 105
- PROCESSING THE IMAGES — 110
- IDENTIFYING FINDINGS IN AN IMAGE — 115
- ADD FINDINGS TO AN OBJECTS DATABASE — 117
- COMPUTING ATTRIBUTES OF THE FINDINGS — 120
- APPLYING RACS TO THE FINDINGS — 125
- GROUPING FINDINGS MEETING A RAC AS A VULNERABILITY GROUPING — 130
- REPORTING THE VULNERABILITY TO A MAINTENANCE ENTITY — 135
- PROVIDING A 3D TOUR OF DEFECTS — 140 images, typically taken during routine maintenance of the structure. A grouping identified as a vulnerability can be reported to a maintenance entity for follow-up.

20 Claims, 13 Drawing Sheets

(52) U.S. Cl.
CPC .......... *G06K 9/6257* (2013.01); *G06T 7/0008* (2013.01); *G06V 10/457* (2022.01); *G06T 2207/20084* (2013.01); *G06T 2207/30184* (2013.01)

(58) Field of Classification Search
CPC ....... G06T 7/0008; G06T 7/00; G06K 9/6215; G06K 9/6227; G06K 9/6257; G06V 10/457; G01N 21/88
See application file for complete search history.

(56) References Cited

U.S. PATENT DOCUMENTS

| | | | |
|---|---|---|---|
| 2013/0155061 A1 | 6/2013 | Jahanshahi et al. | |
| 2015/0009331 A1 | 1/2015 | Venkatraman | |
| 2020/0175352 A1* | 6/2020 | Cha | G06T 7/001 |

OTHER PUBLICATIONS

Gambhir, S. and Gondaliya, N., 2012. A Survey of associative classification algorithms. International Journal of Engineering Research & Technology (IJERT), 1(9), pp. 1-5.*
Matsumoto M, Mitani K, Catbas FN, Bridge assessment methods using image processing and infrared thermography technology. In Proceedings of 92nd Annual Meeting, Japan 2013. Dec. 31, 2013 (Dec. 31, 2013).
Taylor Michael, D'Este Glen, Transport Network Vulnerability: a Method for Diagnosis of Critical Locations in Transport Infrastructure Systems, In Critical infrastructure 2007 (pp. 9-30). Dec. 31, 2007 (Dec. 31, 2007).
PCT Search Report for International Application No. PCT/IL2019/050381 dated Jul. 14, 2019, 4 pp.
PCT Written Opinion for International Application No. PCT/IL2019/050381 dated Jul. 14, 2019, 5 pp.
PCT Preliminary Report on Patentability for International Application No. PCT/IL2019/050381 completed Oct. 1, 2020, 10 pp.
Image-Based Framework for Concrete Surface Crack Monitoring and Quantification—Chen, et al., Advances in Civil Engineering, vol. 2010.
Supplementary European Search Report for European Application No. EP 19781112, completed Apr. 23, 2021, 14pp.

* cited by examiner

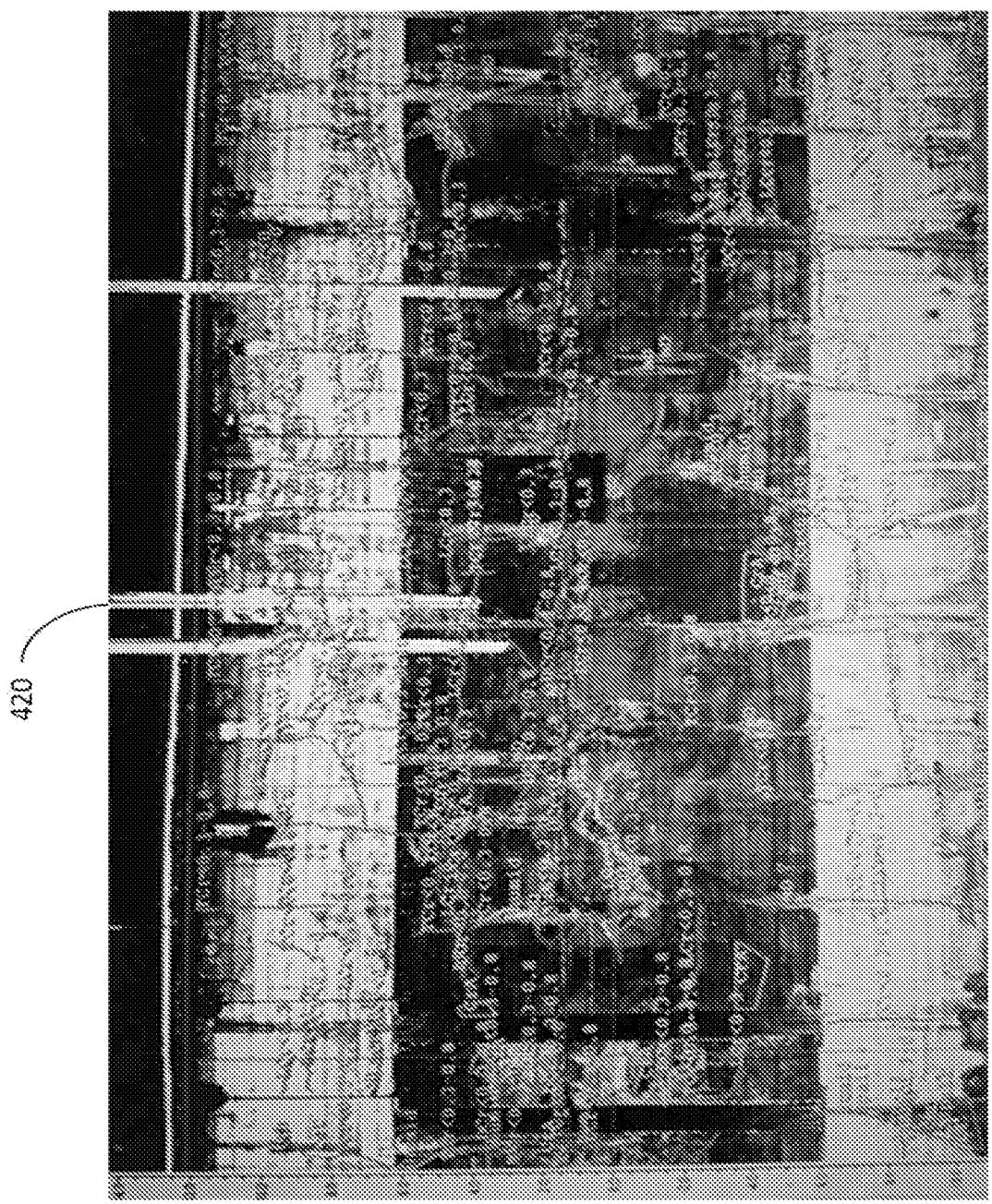
Figure 4B1

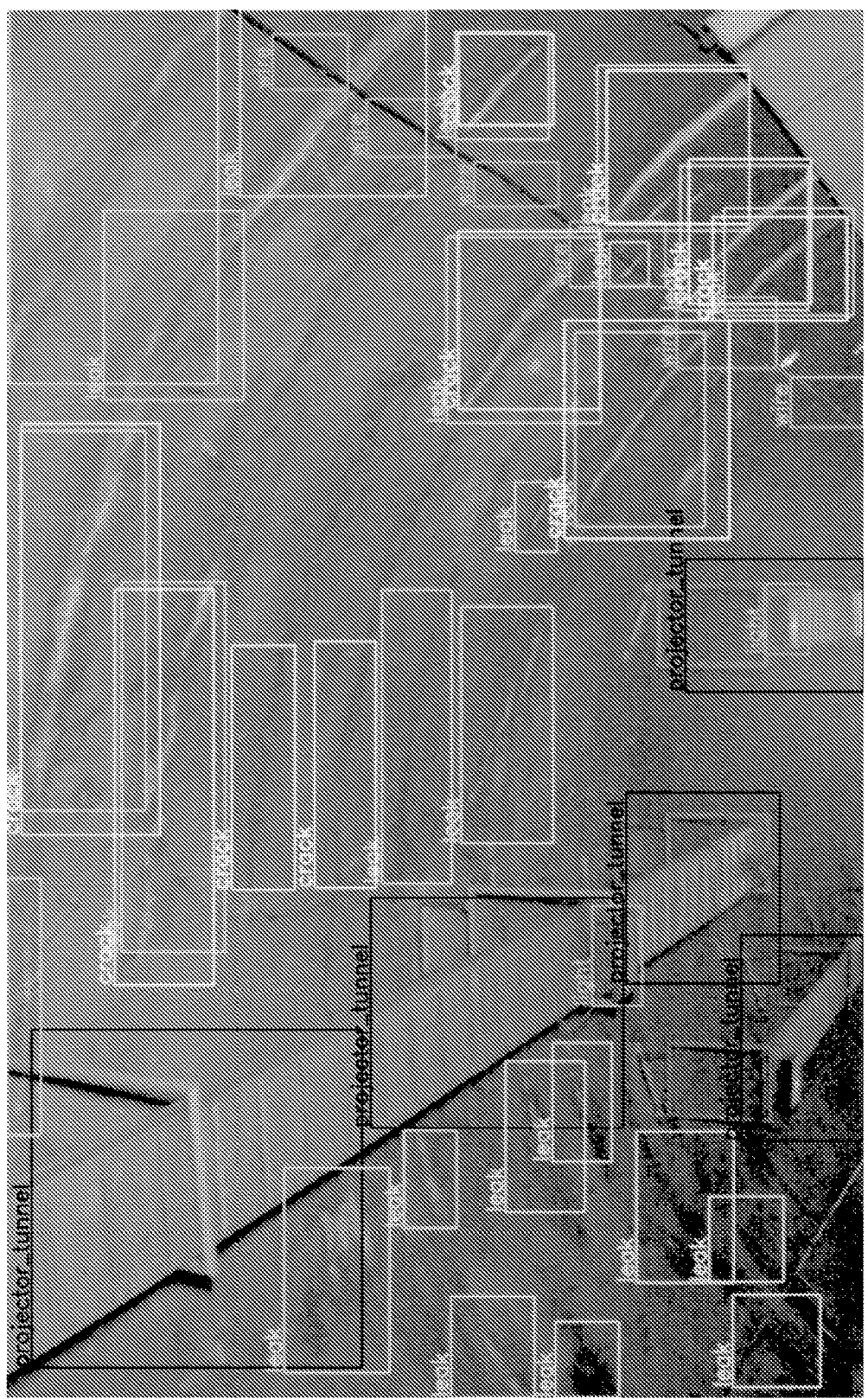
Figure 4B2

SYSTEM AND METHOD FOR EARLY IDENTIFICATION AND MONITORING OF DEFECTS IN TRANSPORTATION INFRASTRUCTURE

CROSS REFERENCE TO RELATED APPLICATIONS

This application is a National Phase of PCT Patent Application No. PCT/IL2019/050381 having International filing date of Apr. 2, 2019, which claims the benefit of priority of U.S. Provisional Application No. 62/761,734 filed on Apr. 5, 2018. The contents of the above applications are all incorporated by reference as if fully set forth herein in their entirety.

FIELD OF THE INVENTION

The present invention is in the field of infrastructure monitoring and maintenance, and in particular relates to a computer-based system and method for early identification and monitoring of defects in transportation infrastructure.

BACKGROUND TO THE INVENTION

Systems and methods for monitoring transportation infrastructure and reporting defects therein are known in the prior art:

Patent KR101604050B discloses a road tunnel inspection device comprising: a tunnel photographing part which photographs a wall or an inner space in a tunnel in order to discriminate an extent of a crack of the tunnel wall, fire breakout in the tunnel and a traffic accident of a vehicle in the tunnel, and transmits the photographed image data; a tunnel inspection part to inspect an inner surface of the tunnel using a tunnel surface inspection device; a water leakage inspection part to inspect a water leakage of the tunnel using a tunnel water leakage inspection device; a communication part to provide an interface to realize communication with an external terminal; an inspection state analysis part which analyzes an occurrence of an abnormal state in the tunnel, by analyzing the tunnel photographing part, the tunnel inspection part, and the water leakage inspection part, and generates an abnormal state notification signal in case of the occurrence of the abnormal state; and a control part to control the tunnel photographing part, the tunnel inspection part, the water leakage inspection part, the communication part, and the inspection state analysis part.

Patent application CN108053132 discloses a bridge defect smart reporting system including a manual tour inspection mobile terminal and a data processing server. The manual tour inspection mobile terminal acquires current position of the tour inspection terminal through a GPS positioning function, collects tour inspection basic information, and obtains a position with bridge defect in the shortest vertical distance to the tour inspection mobile terminal through a semicircle detection method, performs interaction with a data processing server, obtains the bridge defect information of said position, and confirms or updates the bridge loss information of said position according to the tour inspection condition of the bridge defect. The data processing server performs storage treatment on the tour inspection basic information, the tour inspection position and the bridge defect information transmitted by the manual tour inspection mobile terminal by utilizing a data storage service module, obtains a history defect data of the bridge defect position, performs analysis and evaluation on history defect of the position by utilizing a defect priority evaluation function and selects and pushes the bridge defect information having the highest priority level to the manual tour inspection mobile terminal.

U.S. Pat. No. 9,129,355B1 discloses a method and system to assess the damage to infrastructure using aerial images captured from an unmanned aerial vehicle (UAV), a manned aerial vehicle (MAV) or from a satellite device. Specifically, an item of infrastructure may be identified for assessing damage. The UAV, MAV, or satellite device may then capture aerial images within an area which surrounds the identified infrastructure item. Subsequently, the aerial images may be analyzed to determine a condition and the extent and/or severity of the damage to the infrastructure item. Furthermore, the aerial images along with indications of the extent of the damage may be displayed on a computing device.

Publication "Image-Based Framework for Concrete Surface Crack Monitoring and Quantification"—Chen, et al., *Advances in Civil Engineering*, Vol. 2010, Article ID 215295—discloses nondestructive imaging for identification of the most common damage types observed in civil engineering, namely, concrete surface cracks. An optical cameras provide source images. Several advanced image processing methods are applied to the images, including: (i) determination of damage occurrence using time-series images, (ii) localization of damage at each image frame, and (iii) the geometric quantification of damage.

SUMMARY OF THE INVENTION

The present invention relates to a system and method for providing a warning and for monitoring of a vulnerability: a potential defect in a structure and/or its related systems that is not yet apparent as a defect. A type of vulnerability is identified from a grouping of elements and/or features of the structure and its systems, called findings, whose attributes meet a particular selection rules called relationship-association classifiers (RACs): a series of one or more tests of relationships between attributes of findings, the series of tests indicating whether findings are associated and collectively classified as a particular type of vulnerability or defect. Findings are identified and their attributes evaluated from one or more images, typically taken during routine maintenance of the structure.

RACs are based on relationships between attributes of findings known or found to be correlated to a particular type of defect. A RAC may be established by an optimization function or by a neural network function trained from maintenance reports and documented findings and attributes concurrent with each maintenance report.

Groupings identified as a vulnerability can be reported to a maintenance entity for follow-up. Reporting of vulnerabilities can provide an early warning of a problem with a structure and its systems before it becomes a serious defect.

For example, a small and growing crack is found above a venting system hanging on the roof of a tunnel. The crack is identified, with attributes of its rate of growth (found from multiple images taken at different times) and its proximity to a venting system element. A RAC may select growing cracks up to a maximum distance from a venting system element, where both the crack and the element are on the roof of a tunnel. The entire group and its location on the roof may be reported to a maintenance entity as a vulnerability to be checked.

Another aspect of the invention relates to providing a user, typically a maintenance entity, with a "tour" of findings and defects of a structure. The tour can be in 3D. Markers designating defects of various severity are superimposed on a displayed image of the structure. Details of a defect may be displayed or its marker may be selected for more details. The details include the underlying findings—in a grouping—and their attributes and relationships of attributes that led to computing a defect function above a threshold.

Existing 3D solutions, on the other hand, are generally systems like BIM (Building Information Modeling), which is primarily for providing architects, constructors, and designers an accurate 3D modeling of a building for design and planning purposes. The 3D "tour" of the present invention, in contrast, is a way to present and orient a maintenance manager and operator, both post-design and construction functions, to a pin-pointed vulnerability in his assets.

It is therefore an objective of the invention to provide a method for early identification and monitoring of defects in a structure, the method comprising steps of
  a. accumulating one or more images of a structure into an images database;
  b. processing the images;
  c. identifying one or more findings in one of the images;
  d. adding new findings to an objects database;
  e. computing one or more attributes of each of the findings;
wherein the method further comprises steps of
  f. applying one or more relationship-associative classifiers (RACs)—a RAC defined as a set of selection rules defining values of relationships between attributes of the findings—to the findings, wherein the findings whose attributes meet an RAC are grouped into a vulnerability group; and
  g. reporting the vulnerability group to a maintenance entity.

It is a further objective of the invention to provide the abovementioned method, wherein the structure comprises one or more of a tunnel, a bridge, a road, a dam, or a pipeline.

It is a further objective of the invention to provide the abovementioned method, wherein the findings of the structure comprise concrete or iron walls, bearings, deck, piers, abutments, traffic lane control sign (LCS), variable message sign (VMS), barriers, emergency telephone (ERT), signs, public announcements, cameras, safety, visibility sensors, $CO_2$ sensors, heat sensors, fire hoses, vents, doors, railings, pavement, cables, electricity tunnels, covers, traffic lights, road lamps, lighting fixtures, electricity boxes, electric cords, cracks, rust, wet areas, welding exposure, concrete segregation, broken sensors, broken fire hoses, water leaks, loose wires, soot, missing equipment, loose screws, disintegration, waste, broken pavement, inflorescence, exposed iron, missing covers, graffiti, open holes, damaged suspension cables, potholes, or any combination thereof.

It is a further objective of the invention to provide the abovementioned method, wherein positions of the findings depicted in an image found by matching a pattern in the image with positions of matching findings in previous images.

It is a further objective of the invention to provide the abovementioned method, wherein the attributes of the findings comprise one or more of location, color, shape, size, texture, depth, width, height, area, impact distance from a source of the finding, quantity of elements within a particular radius, distance from a particular utility, distance from a past corrective action area, influence on core infrastructure, percentage of exposure, and physical connectivity to another finding.

It is a further objective of the invention to provide the abovementioned method, wherein the vulnerability object comprises findings objects associated with findings from two or more functional groups of the structure.

It is a further objective of the invention to provide the abovementioned method, wherein the functional groups comprise one or more of structural, electricity, air conditioning, a lifesaving system, an air quality system, a signing system, a fire detection system, and a fire mitigation system.

It is a further objective of the invention to provide the abovementioned method, wherein the RACs are learned using a neural network technique.

It is a further objective of the invention to provide a system for identifying defects in transportation infrastructure, comprising
  a. an images database, storing accumulated images of a structure;
  b. an image processing module, configured to process the images;
  c. a findings processing module and an objects database comprising a findings sub-database and a vulnerabilities sub-database, the findings operations unit configured to
    i. identify findings in one or more of the images;
    ii. store new the identified findings as a findings object in the findings sub-database;
    iii. compute attributes of each the finding in a findings object corresponding to the finding; and
wherein the system further comprises
  d. a rules engine, configured to
    i. apply relationship-associative classifiers (RACs)—a RAC defined as a set of selection rules defining values of relationships between attributes of the findings, the relationship values indicative of a vulnerability of the structure—to one or more of the attributes of the findings objects;
    ii. grouping the finding objects meeting the RACs into one or more vulnerability groupings;
    iii. store vulnerability objects comprising the grouped finding objects or references thereto; and
  e. a reporting module, configured to report the vulnerability object and findings objects therein to a maintenance entity.

It is a further objective of the invention to provide the abovementioned system, wherein the structure comprises one or more of a tunnel, a bridge, a road, a dam, or a pipeline.

It is a further objective of the invention to provide the abovementioned system, wherein the findings of the structure comprise concrete or iron walls, bearings, deck, piers, abutments, traffic lane control sign (LCS), variable message sign (VMS), barriers, emergency telephone (ERT), signs, public announcements, cameras, safety, visibility sensors, $CO_2$ sensors, heat sensors, fire hoses, vents, doors, railings, pavement, cables, electricity tunnels, covers, traffic lights, road lamps, lighting fixtures, electricity boxes, electric cords, cracks, rust, wet areas, welding exposure, concrete segregation, broken sensors, broken fire hoses, water leaks, loose wires, soot, missing equipment, loose screws, disintegration, waste, broken pavement, inflorescence, exposed iron, missing covers, graffiti, open holes, damaged suspension cables, potholes, or any combination thereof.

It is a further objective of the invention to provide the abovementioned system, wherein positions of the findings depicted in an image is found by matching a pattern in the image with positions of matching findings in previous images.

It is a further objective of the invention to provide the abovementioned system, wherein the attributes of the findings comprise one or more of location, color, shape, size, texture, depth, width, height, area, impact distance from a source of the finding, quantity of elements within a particular radius, distance from a particular utility, distance from a past corrective action area, influence on core infrastructure, percentage of exposure, and physical connectivity to another finding.

It is a further objective of the invention to provide the abovementioned system, wherein the vulnerability object comprises findings objects associated with findings from two or more functional groups of the structure.

It is a further objective of the invention to provide the abovementioned system, wherein the functional groups comprise one or more of structural, electricity, air conditioning, a lifesaving system, an air quality system, a signing system, a fire detection system, and a fire mitigation system.

It is a further objective of the invention to provide the abovementioned system, wherein the RACs are learned using a neural network technique.

BRIEF DESCRIPTION OF THE DRAWINGS

FIGS. 4A-4D show various display outputs of a system for monitoring defects in infrastructure, according to some embodiments of the invention.

DETAILED DESCRIPTION

Definitions:

"Structure" can refer to a transportation structure such as a tunnel, bridge, or culvert; or any other structure such as a dam, pipeline, or water/sewage pipe.

"Element" refers to any part of a structure. Examples of elements include concrete, pavement, railings, barriers, vents, signs, lights, sensors, fire hydrants, and electrical cables. Elements of a bridge may include a roadway, trusses, suspension cables, lampposts, and bridge traffic signs. Elements of a tunnel may include walls, ceiling, tiles, ventilation shafts, and $CO/CO_2$ sensors, and safety signs.

"Finding" refers to an element or feature of an element in one or more images of a structure. An element or feature can be counted as a finding whether it appears normal in the image or anomalous (e.g., misshapen, enlarged, diminished, discolored, dis-textured, or missing), or whether the feature itself is an anomaly (e.g., a crack, wet spot, or rust spot, broken sign).

"Vulnerability" refers to a group of one or more findings whose attributes are deemed to indicate a defect or potential defect of a structure and its systems when a rule or set of rules is applied.

"Relationship-associative classifier (RAC)" refers to a series of one or more tests of relationships between attributes of findings, the series of tests indicating whether findings are associated and collectively classified as a particular type of vulnerability or defect.

"Maintenance entity" refers to a party with an involvement or interest in the maintenance of a structure, its systems, or element(s) therein. Examples of a maintenance entity can include, for example, a company responsible for operations, engineering, maintenance engineering, maintenance, assets inventory manager, risk assessment, maintenance planning, electricity, or plumbing; or an asset owner, or any company or person(s) involved in the infrastructural element.

Figure 1:
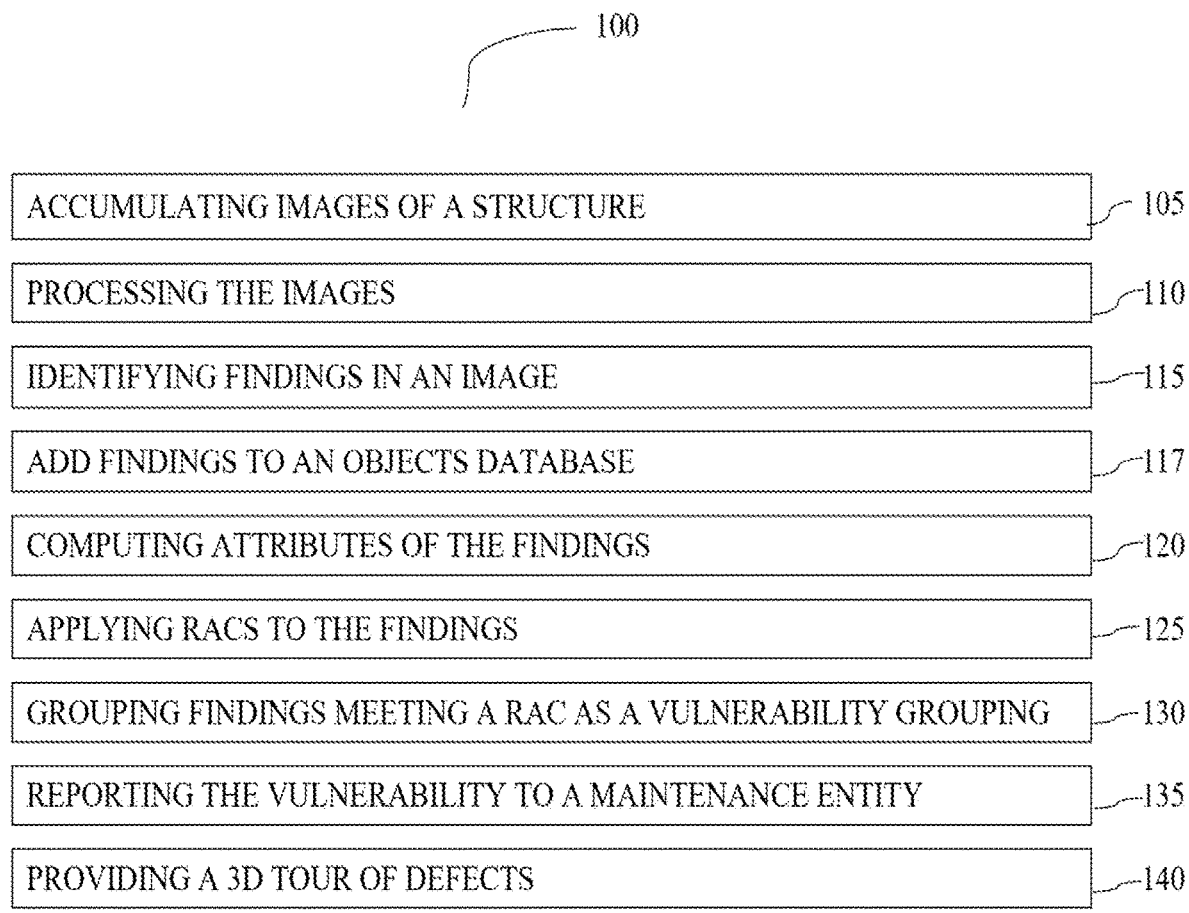
FIG. 1 lists steps of a method for monitoring defects in infrastructure, according to some embodiments of the invention.

Reference is now made to FIG. 1, showing steps of a computer-based method 100 for monitoring defects in infrastructure, according to some embodiments of the invention.

Method 100 comprises accumulating one or more images of a structure 105. A typical structure can be a transportation structure such as a tunnel, bridge, or culvert; or any other structure such as a dam or pipeline. Descriptions in this application shall be made as pertaining to tunnels; however, it is appreciated that the teachings of the invention apply to any transportation structure and other types of structures.

Each image is typically obtained during the course of maintenance and operations performed at the structure. Accumulating of the images 105 is typically to a database. Each image may be, for example, a photograph, a thermal image, or a LIDAR image. Images may be directly digitized upon exposure; or developed, printed, and scanned. An image is typically accompanied with metadata such as the ID number of the contractor who took the image; a timestamp; data of the image-taking camera, such as location and aiming direction of the camera, f-stop, lighting, and exposure time; and/or a maintenance report. Accumulated images taken at various times contribute to a dynamic and ongoing understanding of potential defects of the structure and its elements, as further described herein.

For purposes of clarity, some steps herein are described with regard to one image. It is appreciated that some or all steps may be repeated for each of the accumulated images of the structure. It is also understood that some steps of the method 100 may be performed more than once.

Method 100 further comprises processing the images 110, in preparation for identifying findings 107 (further described herein). Techniques of processing an image 110 can be, for example, filtering, normalization of color channels, cropping, resizing, translation, rotation, inversion, and rescaling.

Method 100 further comprises identifying findings of the structure in an accumulated image 115. Findings are elements or features of elements of the structure. For example, wall segments, ceiling, tiles, ventilation shafts, fire hoses, wires, equipment, screws, pavement, lampposts, lighting fixtures, $CO/CO_2$ sensors, and safety signs; or features thereof.

Findings depicted in the image may be identified, for example, by matching a pattern in the image with elements in previously analyzed accumulated images or with an original image or model of the structure. Alternatively, or in addition, findings may be identified by matching attributes (e.g., location, size, color, shape) with those of previously found findings.

Identified findings 115 may comprise both new findings as well as findings previously identified from earlier accumulated images. A finding may be an element or feature pictured in the image in its normal condition or may—in whole or in part—have an anomaly such as a crack, rust, wet areas, welding exposure, concrete segregation, water leaks, soot, disintegration, waste, exposed iron, missing covers, graffiti, holes, potholes, among others, and combinations thereof.

In some embodiments, identifying findings 115 comprises distinguishing whether an element is in its normal state; or whether the element is in an anomalous state or contains an anomalous feature. Examples of normal and anomalous states of elements, and resulting findings, are indicated in the Table 1.

TABLE 1

| Feature | Normal condition | Finding | Anomalous state(s)/feature(s) | Finding |
|---|---|---|---|---|
| Wall | Dry | None | Wet | Wet spot |
| Electricity box | Painted | Normal electricity box | Rusted | Rusted electricity box |
| Concrete | Uniform | None | Segregated | Segregated concrete |
| Tile | Smooth | None | Cracked or missing | Cracked/Missing tile |
| Cable | Continuous insulation | None | Exposed wiring | Exposed wiring |
| Sensor | Present and unbroken | Normal sensor | Missing or broken | Missing/Broken sensor |

Method 100 further comprises adding new findings to an objects database 117 and computing attributes of the identified findings 120. An attribute of a finding may be the functional group to which the finding belongs. For example, cracks and segregated concrete have a functional group attribute of "structural," while an electrical box and cables have a functional group attribute of "electrical."

Other attributes of a finding may include, for example, location, color, shape, size, texture, depth, width, height, area, distance from a source of an anomaly, quantity of elements within a particular radius, distance from a particular utility, distance from a past corrective action area, degree of influence on core infrastructure, percentage of exposure, among others, and any combination thereof.

A finding may be assigned, according to the type of the finding, a template of attributes. For example, a crack can have an attribute of whether or not the crack is leaking. Attributes in the template are computed 120 and updated in the objects database. Attributes and relationships may be updated statistically, with a level of confidence of an evaluated attribute value (e.g., depending on image quality, perspective, analysis confidence, etc.) weighted against a level of confidence of an existing attribute value. A finding's previous attribute values may be archived (e.g., in the objects database), thereby enabling development of a timeline history of attributes of each finding.

Method further comprises applying relationship-associative classifiers (RACs) to the findings 125. A RAC is a series of one or more tests of relationships between attributes of findings indicating whether findings are associated and collectively classified as a particular type of vulnerability or defect. A RAC is designed to test mutual presence or attributes of findings that are potentially correlated to a condition of concern in the structure, and therefore identified as a vulnerability.

Non-limiting examples of RACs for a tunnel are
A RAC for a crack-density vulnerability groups cracks in a region in which all cracks are less than 1 cm from the nearest crack.
A RAC for proximity hazard of a leaking crack to the ventilation system associates ventilation system findings and cracks that are leaking and whose distance to a ventilation system finding is less than 10 cm.
A RAC for growing rust vulnerability associates a region of segregated concrete and a total rust area which is bigger than last year's total rust area on the same segregated concrete region.
A RAC for a vulnerability of water damage caused by a leaking hose associates a fire hose with overlapping cracks that are leaking.
A RAC for emphasizing location-based vulnerabilities that associates vulnerabilities found by other RACs, such as vulnerabilities on the roof of a tunnel or a pillar of a bridge.

RACs may be programmed manually or computed with an optimization algorithm. In some embodiments, a neural network algorithm may be employed to learn RACs, trained, for example, by maintenance reports. The algorithm may neurally analyze attributes of findings in a concurrent and past time frame of each maintenance report.

Method further comprises grouping the selected findings for each RAC as a vulnerability 130. In some embodiments, step 125 may be repeated for new images, and additional findings may be added to a grouping of findings.

Method further comprises reporting identified vulnerabilities 135. The vulnerabilities may be reported to one or more engineering entities, e.g. for follow-up action such as an inspection. Reported data may be accompanied by images, findings, and attributes contributing to each vulnerability.

In some embodiments, method 100 further comprises providing a 3D tour of findings and vulnerabilities of the structure 140.

Reference is now made to FIGS. 2A-2G. To demonstrate method 100, a non-limiting example is now described.

Figure 2A:
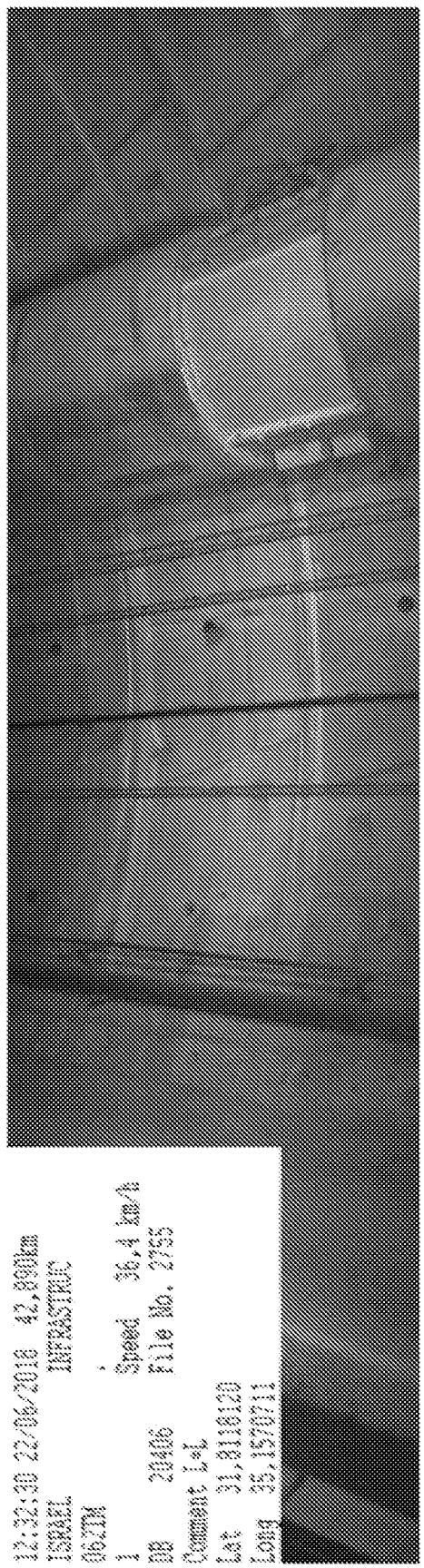
FIGS. 2A-2G show a progression of an image as processed during a method for monitoring defects in infrastructure, according to some embodiments of the invention.
Figure 2B:
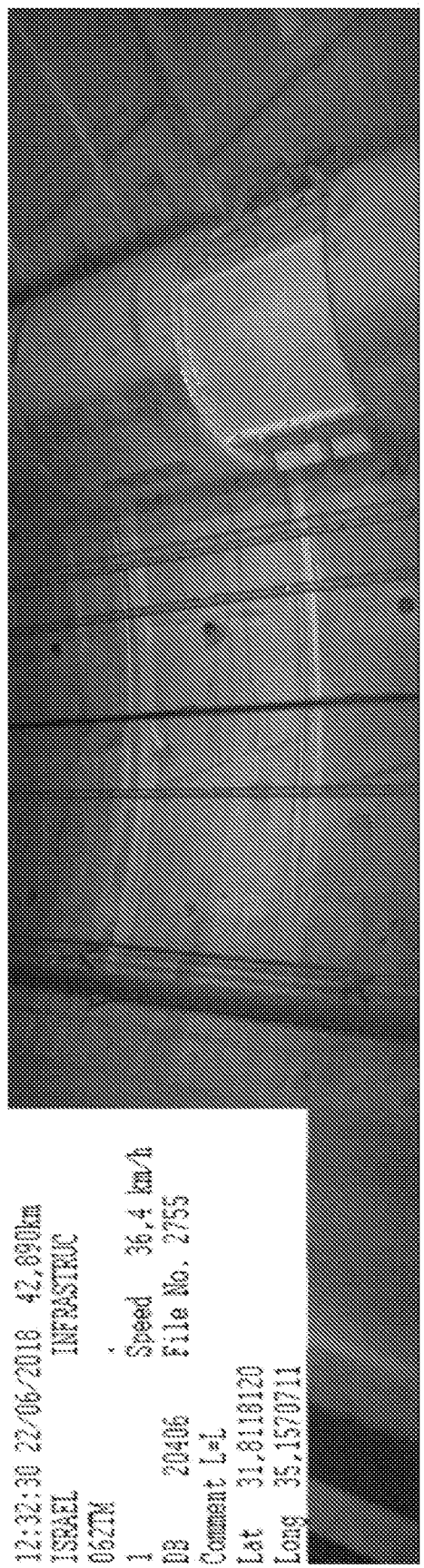
Figure 2C:
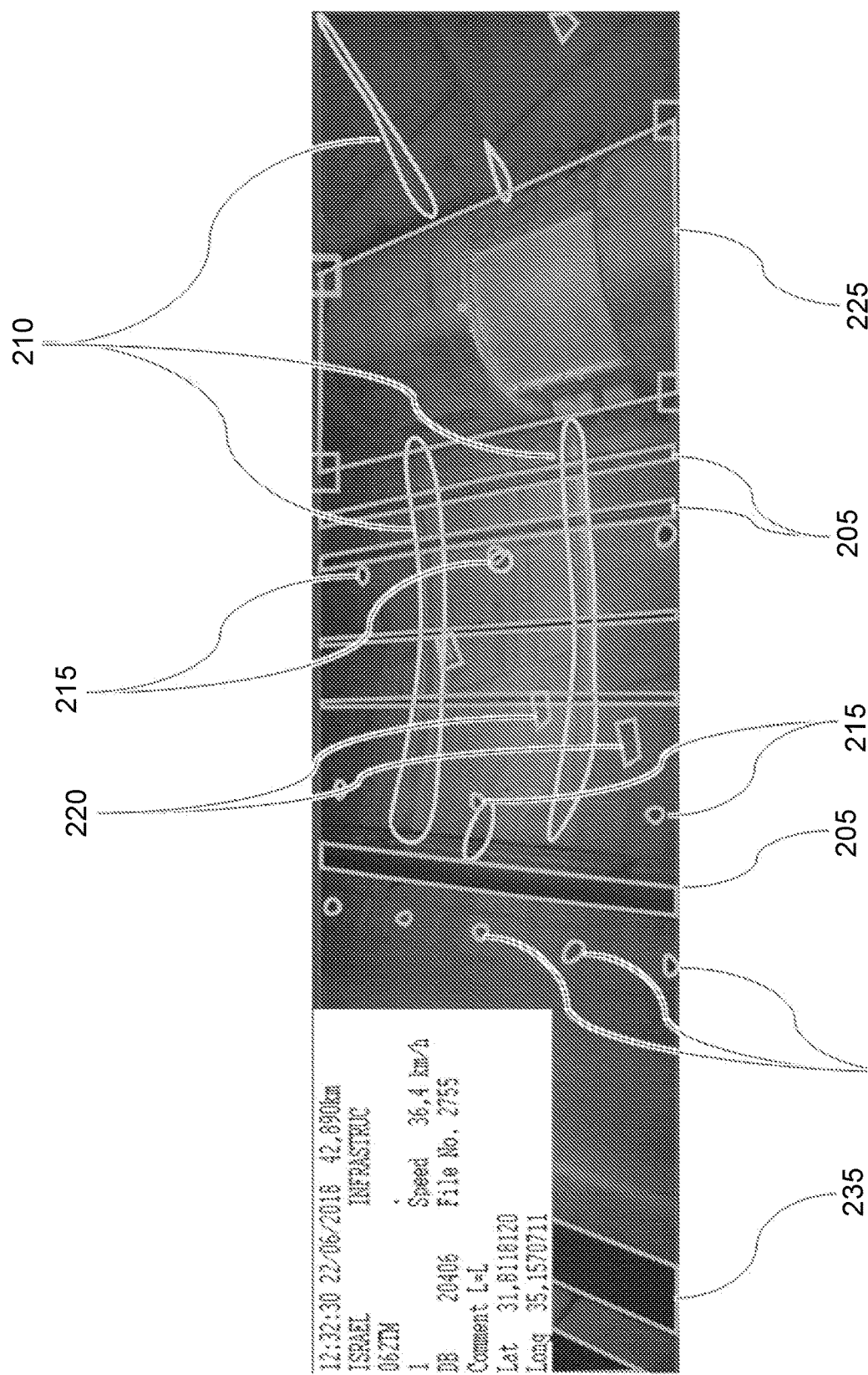

FIG. 2A shows an image accumulated 105 in a database. The image depicts an interior wall of a rail tunnel. FIG. 2B shows the image after image processing 110, including normalization, rotation, and registration to a reference. FIG. 2C shows the image with superimposed outlines of findings after identifying findings 115. The findings include electric wiring 205, leakage 210, planned structural holes 215, color changes 220, a jet fan 225, and railroad tracks 235.

Figure 2D:
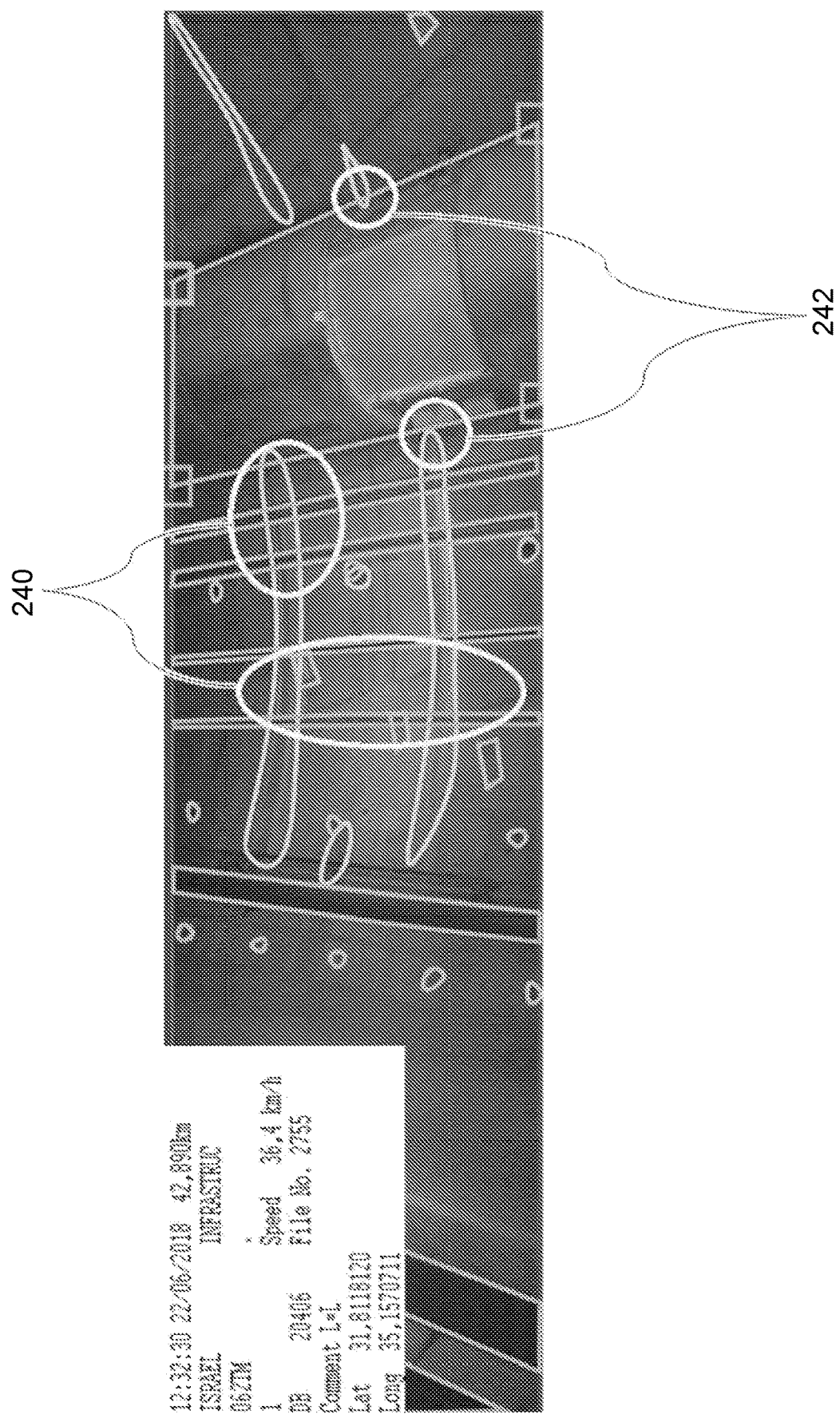

FIG. 2D shows the findings after applying RACs to the findings 125 and grouping findings meeting each RAC 130. Short circuit vulnerabilities 240 are identified by overlap of leakage 210 and electric wiring 205 behind jet fan 225. A fan damage vulnerability 242 242 is identified by direct leakage of water behind the main jack box of the jet fan.

Figure 2E:
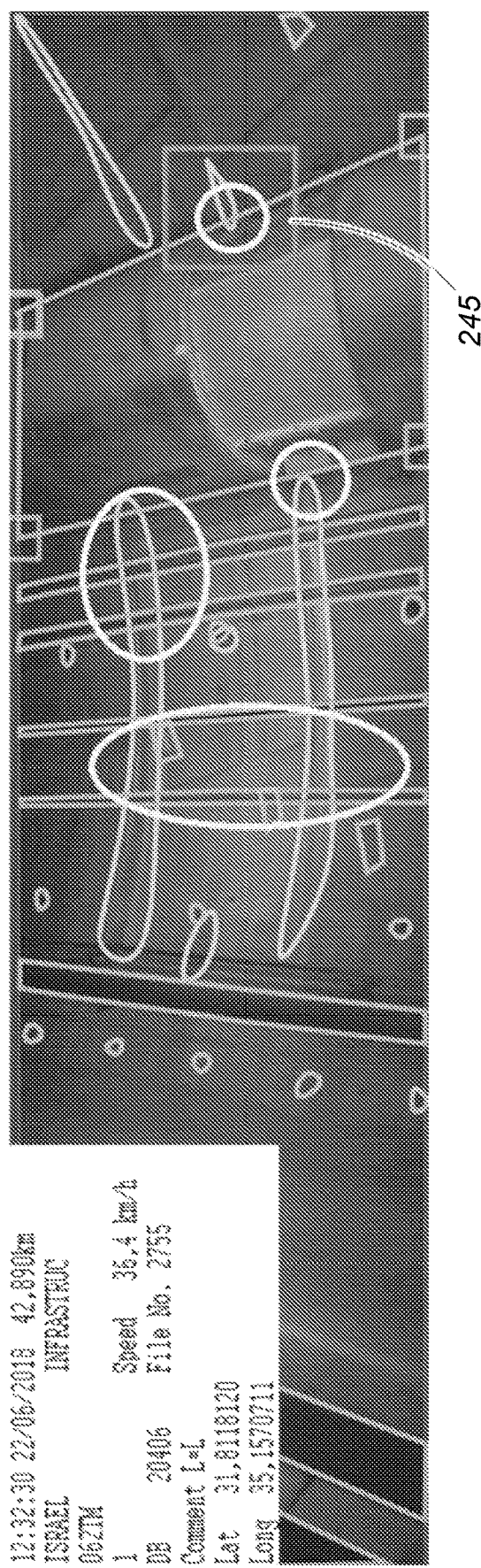

FIG. 2E shows a selected vulnerability 245 comprising active leakage above a main jack box of a jet fan.

Figure 2F:
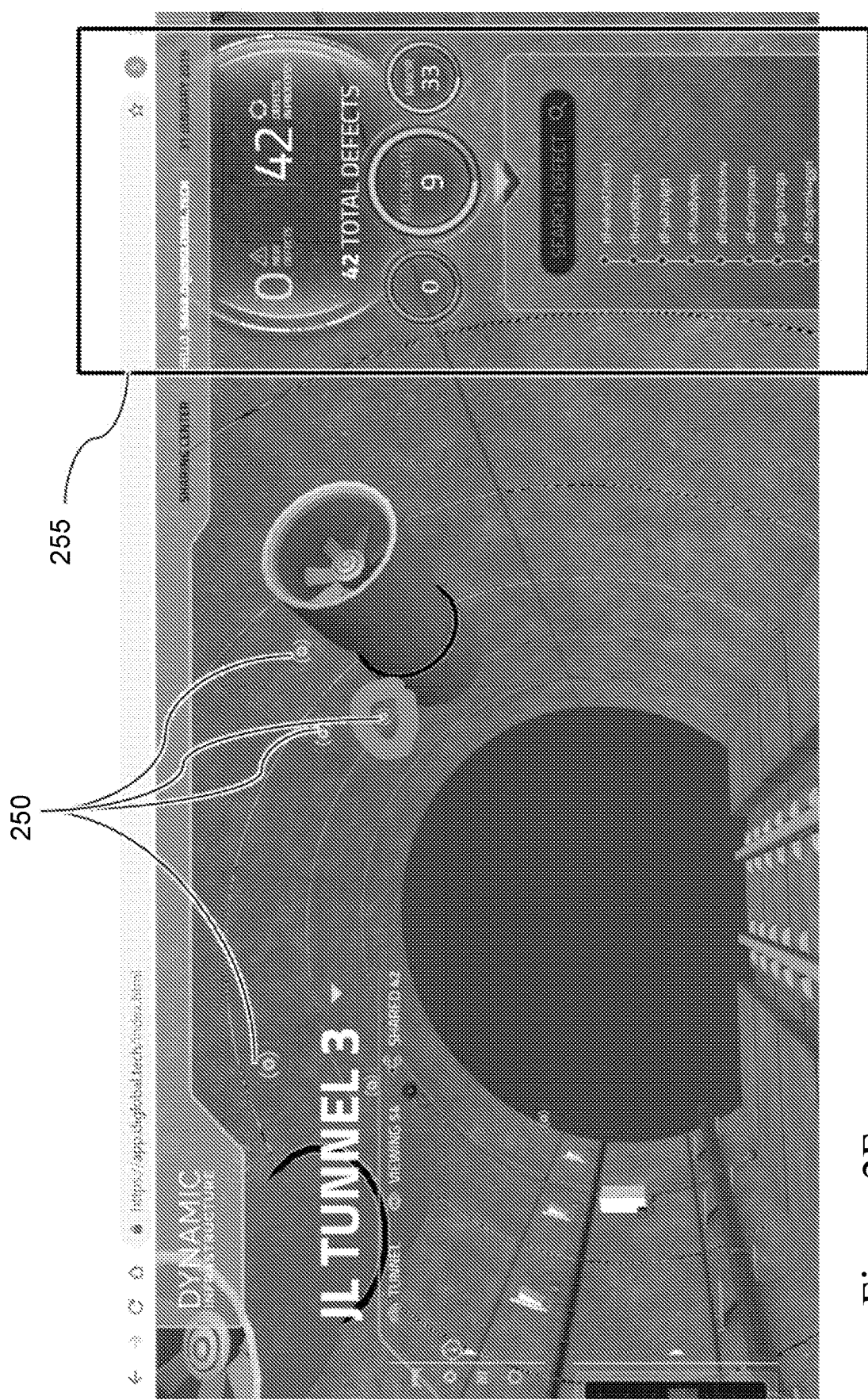
Figure 2G:

FIG. 2F shows markers 250 indicating identified defects during providing of a 3D tour of the tunnel. A sidebar 255 shows a summary of the severity and numbers of defects. FIG. 2G shows details about the marked vulnerabilities, shown upon a user clicking a marker 250.

Figure 3:
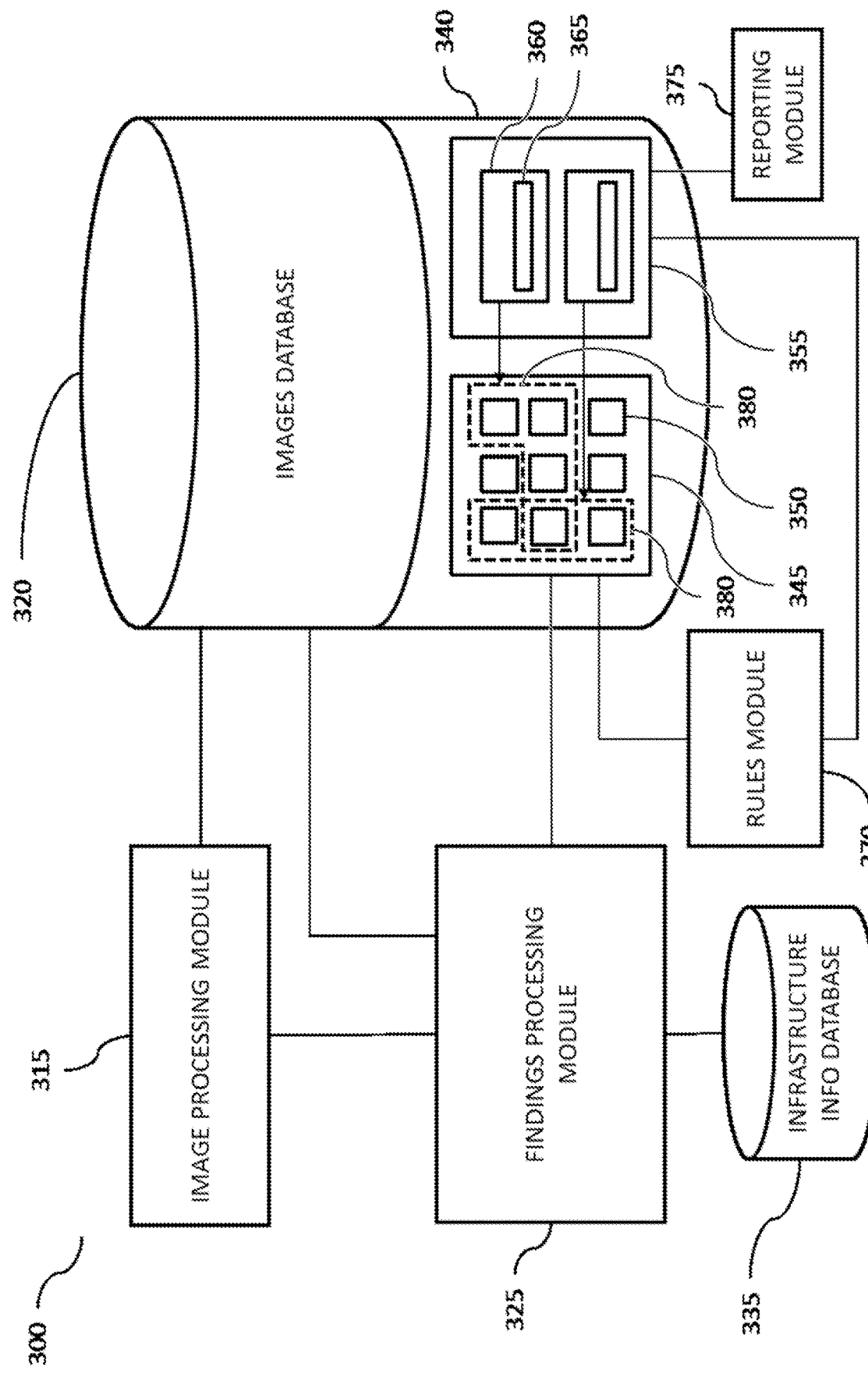
FIG. 3 shows a functional block diagram of modules in a system for monitoring defects in infrastructure, according to some embodiments of the invention.

Reference is now made to FIG. 3, showing a functional block diagram of a system 300 for monitoring defects in infrastructure, according to some embodiments of the invention. System 300 comprises one or more processors and one or more non-transitory computer-readable mediums (CRMs). The CRMs store instructions to the processor for operation of modules of system 300, as herein described.

System 300 comprises an images database 320 and an image processing module 315. Images database 320 stores images of a structure. A typical structure can be a transportation structure such as a tunnel, bridge, or culvert; or any other structure such as a dam or pipeline. Each image is typically obtained during the course of maintenance and operations performed on the structure. Each image may be a photograph, a thermal image, or a LIDAR image. Images may be directly digitized upon exposure; or developed, printed, and scanned. An image is typically accompanied with metadata such as the ID number of the contractor who took the image; a timestamp; data of the image-taking camera, such as location and aiming direction of the camera, f-stop, lighting, and exposure time; and/or a maintenance report.

Image processing module 315 is configured to process a raw image in order to prepare the image for identification of findings. Image processing module 315 may employ techniques such as filtering, normalization of color channels, cropping, resizing, translation, rotation, inversion, and rescaling. Image processing module 315 may generate intermediate images processed from a raw image. Some intermediate images and segmented images may be stored, in whole or in part, in images database 320, in association with the raw image.

System 300 further comprises a findings processing module 325. Findings processing module 325 detects and indexes findings in an image of the structure. Findings processing module 325 may detect findings in an image by matching a pattern in the image with identified findings in previously processed images in images database 320. Alternatively, or in addition, findings processing module 325 may match attributes (e.g., location, size, color, shape) with those of previously found findings in an objects database 340 (further described herein).

Findings processing module 325 further computes attributes of findings. Findings processing module 325 adds the attributes or a link thereto to a findings object 350 of the finding.

System 300 optionally comprises an infrastructure information database 335, which may store, for example, CAD drawings, satellite photos, and/or geo maps of the structure. Elements identification module 325 may employ infrastructure information database 335 to assist in identifying findings.

System 300 further comprises an objects database 340. Objects database 340 comprises a findings sub-database 345. Findings sub-database 345 stores findings objects 350. Each findings object 350 comprises or links to a findings identifier and attributes of the identified finding. Objects database 340 further comprises a groupings sub-database 355. Grouping sub-database 355 stores grouping objects System 300 further comprises a rules module 370. Rules module 370 is configured to apply relationship-associative classifiers (RACs) to each finding and group findings objects 350 of findings meeting the selection rule into groupings. A grouping is a group of one or more findings whose presence or attributes are of concern, because the findings in the grouping are correlated such that they may stem from the same conditions or constitute a particular risk to the structure—a vulnerability. Vulnerabilities may be further monitored by system 300 and/or reported to a maintenance entity for follow-up attention. In an example of monitoring vulnerabilities, rules module 370 may apply several RACs with progressive thresholds of a particular type of vulnerability. For example, an expanding crack may not meet the growth-rate (or crack length) threshold of a RAC of the most severe crack, but may meet a lower growth-rate threshold RAC and worthy of monitoring. Beyond a particular level RAC-growth-rate threshold, cracks may be reported, along with the level of severity, to a maintenance entity.

In some embodiments, a vulnerability may comprise more than one type of finding. For example, a wet crack may be grouped with rust on an electrical box. In some embodiments, a vulnerability may comprise only one finding. For example, a crack (among thousands of other cracks) in a tunnel roof may be placed in a grouping because the crack is collocated with a screw fastening a vent to the roof.

Findings may be grouped as a vulnerability if they are of a common functionality group, geometrical location in the structure, material type, surface structure, temperature, IR absorbance or reflectance, or caused or affected by the same external forces (such as by a shock wave or vehicular crash).

A vulnerabilities sub-database 355 of objects database 340 stores vulnerability objects 360. A vulnerability object 360 specifies which findings objects 350 are in the vulnerability grouping. Rules module 370 inspects findings objects 345 and creates new vulnerability objects 360 or adds findings to an existing vulnerability object 360. Rules module 370 may be trained (i.e., supplied with new or optimized RACs) by a neural network algorithm correlating defects reported by a maintenance entity with attributes of findings recorded before the defect report.

System further comprises a reporting module 375, which reports the findings associated with the vulnerability object 360 as a vulnerability. Reports may present data, for example, tabular, graphical, and/or in 3D.

Figure 4A:
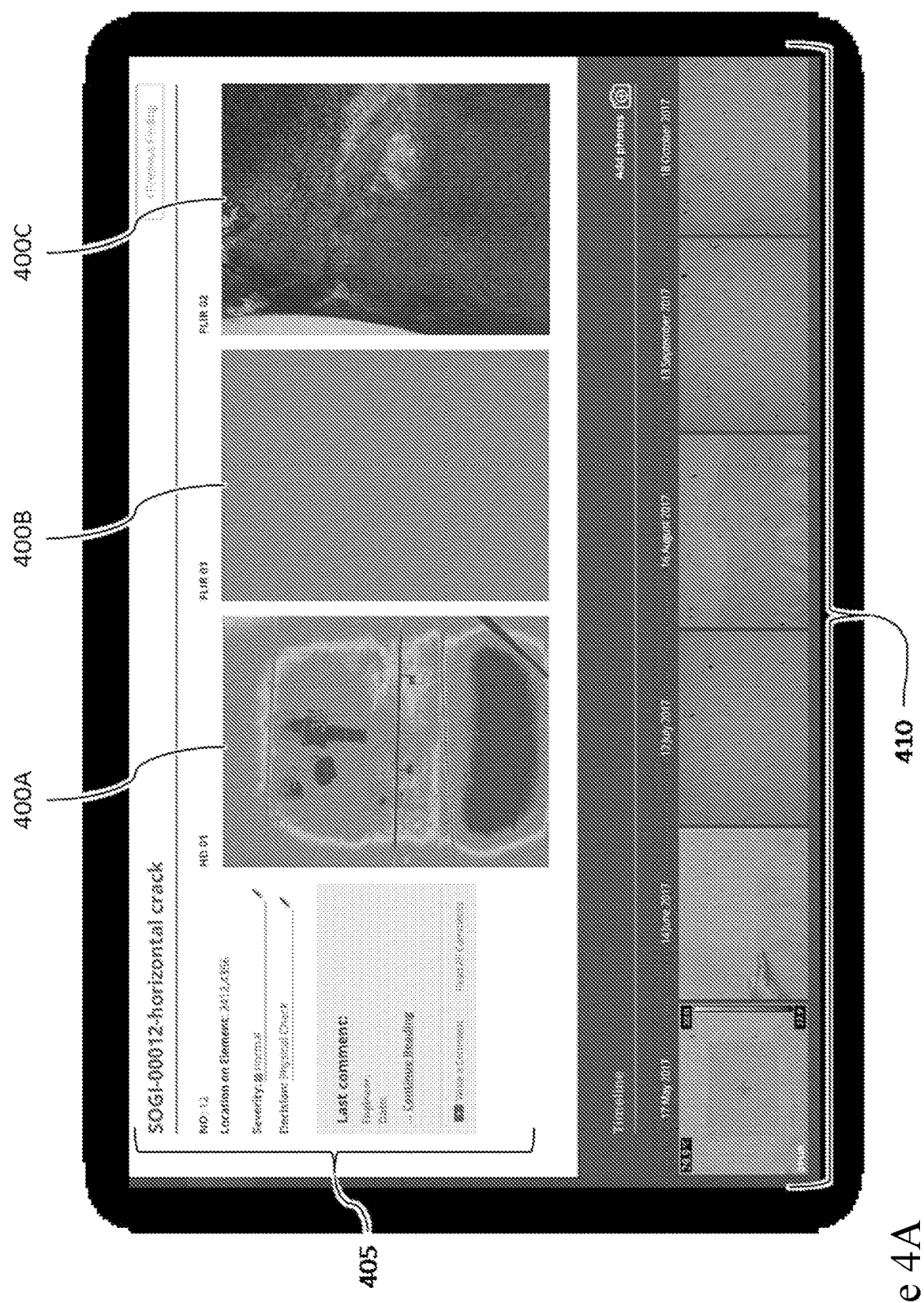

For example, FIG. 4A1 shows images 400A-400C of a crack in a tunnel from three different cameras. The images are accompanied by a description 405 of present status and recommendation, based on the crack's identifying RAC and the crack's attributes. The images are accompanied by past images 410 accumulated by system 300 and dates each past image was taken, thereby indicating a timeline depicting the progression of the crack.

FIGS. 4B1 and 4B2 shows an image 420 of a tunnel wall and roof, respectively, on which are superimposed identifiers of findings on the wall. Each identifier is disposed at the location of the finding. A user of system 400 may click on an identifier to learn more details about the underlying finding.

Figure 4C:
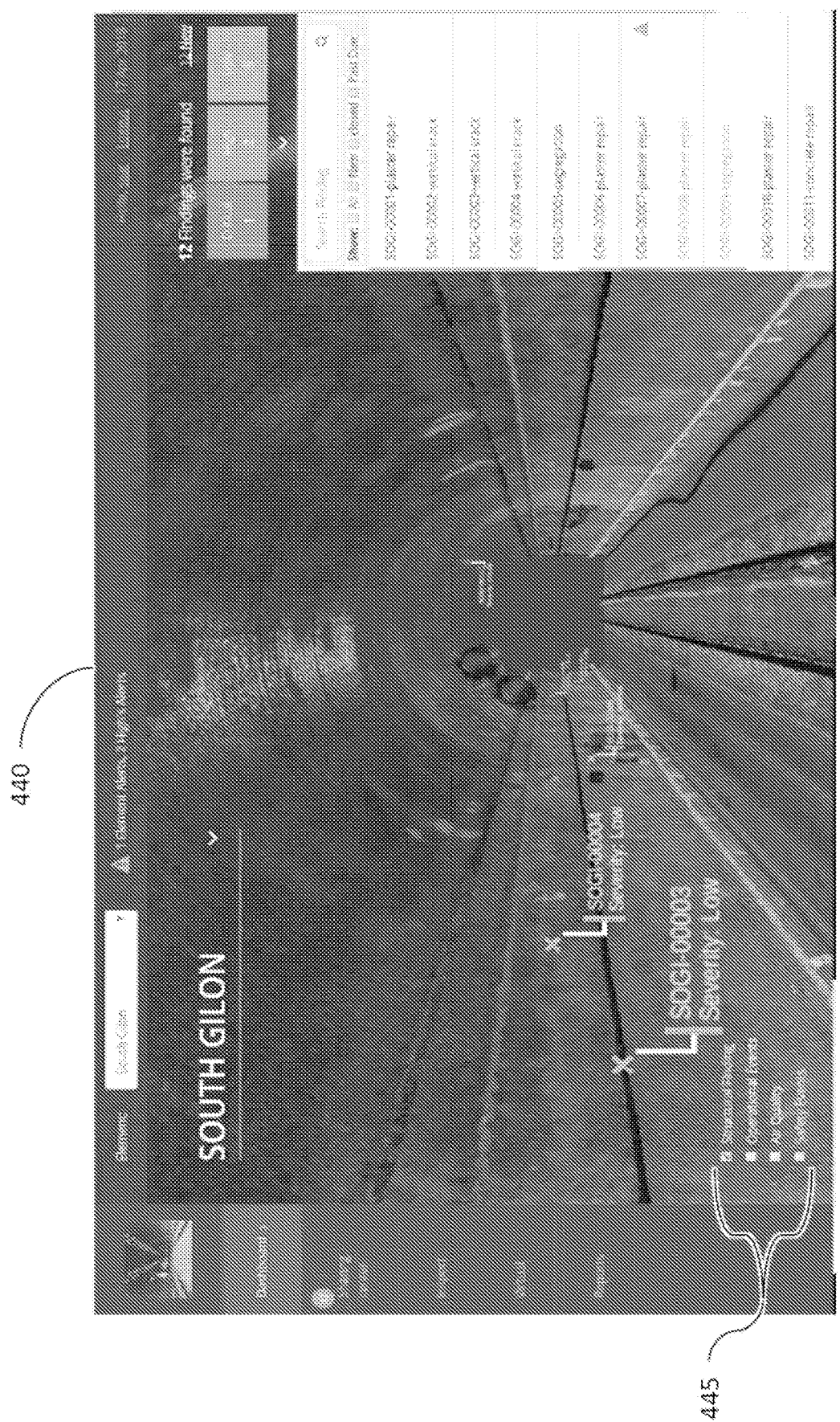

FIG. 4C shows an image 440 along the length of the tunnel with superimposed identifiers of defects in the tunnel. A user of system 400 may indicate in the checkboxes 445 what kinds of defects to show.

Figure 4D:
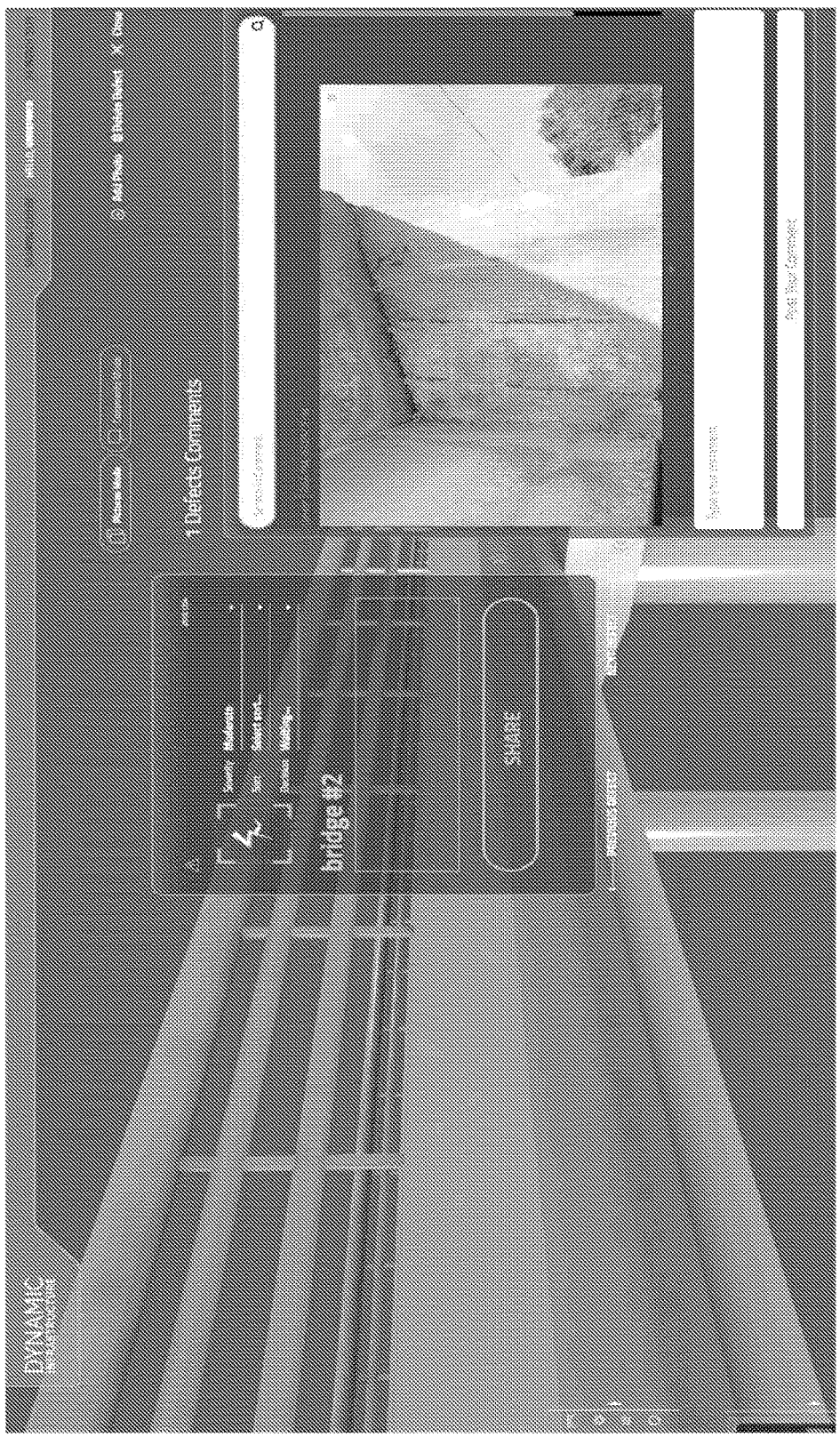

FIG. 4D shows a user interface of a system for detecting an monitoring vulnerabilities of a bridge.

The invention claimed is:

1. A method of detection of vulnerabilities in a structure, the method comprising:
   a. accumulating images of a structure taken during routine maintenance of the structure into an image database, the images being multiple images taken at different times;
   b, processing the images;
   c. detecting and indexing one or more findings, a finding being a grouping of elements and/or features of the structure, in said one or more images, wherein the multiple images being taken at different times enables development of a timeline history of attributes of each finding;
d. adding said one or more findings to an object database;
e. computing one or more attributes of each of the findings;
f. testing relationships between said one or more attributes of two or more types of said findings against selection rules of one or more relationship-associative classifiers (RACs); each one or more RAC associated with one of said vulnerabilities of said structure;
g. grouping the findings with attributes meeting said RAC into a vulnerability group of said RAC; and
h. reporting the vulnerability group to a maintenance entity as one of said vulnerabilities.

2. The method of claim 1, wherein the structure comprises one or more of a tunnel, a bridge, a road, a dam, or a pipeline.

3. The method of claim 2, wherein the findings of the structure comprise concrete or iron walls, bearings, deck, piers, abutments, traffic lane control sign, variable message sign, barriers, emergency telephone, signs, public announcements, cameras, safety, visibility sensors, $CO_2$ sensors, heat sensors, fire hoses, vents, doors, railings, pavement, cables, electricity tunnels, covers, traffic lights, road lamps, lighting fixtures, electricity boxes, electric cords, cracks, rust, wet areas, welding exposure, concrete segregation, broken sensors, broken fire hoses, water leaks, loose wires, soot, missing equipment, loose screws, disintegration, waste, broken pavement, inflorescence, exposed iron, missing covers, graffiti, open holes, damaged suspension cables, potholes, or any combination thereof.

4. The method of claim 1, wherein positions of the findings depicted in said one or more images found by matching a pattern in the one or more images with positions of matching findings in said one or more images taken during maintenance and/or operations of said structure.

5. The method of claim 1, wherein the attributes of the findings comprise one or more of location, color, shape, size, texture, depth, width, height, area, impact distance from a source of the finding, quantity of elements within a particular radius, distance from a particular utility, distance from a past corrective action area, influence on core infrastructure, percentage of exposure, and physical connectivity to another finding.

6. The method of claim 1, wherein the vulnerability comprises findings from two or more functional groups of the structure.

7. The method of claim 6, wherein the functional groups comprise one or more of structural, electricity, air conditioning, a lifesaving system, an air quality system, a signing system, a fire detection system, and a fire mitigation system.

8. The method of claim 1, wherein the RACs are learned using a neural network technique.

9. A system for detection of vulnerabilities in a structure, comprising
a. an image database, configured to store accumulated images of said structure, taken during routine maintenance of the structure, the images being multiple images taken at different times;
b. an image processing module, configured to process the accumulated images;
c. a findings processing module and an object database comprising a findings sub-database and a vulnerabilities sub-database, the findings processing module configured to
   i. detect and index findings, findings being groupings of elements and/or features of the structure in one or more of the images, wherein the multiple images being taken at different times enables development of a timeline history of attributes of each finding;
   ii. store detected findings as a findings object in the findings sub-database; and
   iii. compute attributes of said findings of each of said findings object;
wherein the system further comprises
d. a rules engine, configured to
   i. test at least one relationship between said attributes of two or more types of said findings against selection rules of relationship-associative classifiers (RACs); each said RAC associated with a vulnerability of said structure;
   ii. group the finding object with attributes meeting said RAC into a vulnerability grouping of said vulnerability; and
   iii. store vulnerability objects comprising the grouped finding objects or references thereto; and
e. a reporting module, configured to report the vulnerability object and findings objects therein as said vulnerability to a maintenance entity.

10. The system of claim 9, wherein the structure comprises one or more of a tunnel, a bridge, a road, a dam, or a pipeline.

11. The system of claim 10, wherein the findings of the structure comprise concrete or iron walls, bearings, deck, piers, abutments, traffic lane control sign, variable message sign, barriers, emergency telephone, signs, public announcements, cameras, safety, visibility sensors, $CO_2$ sensors, heat sensors, fire hoses, vents, doors, railings, pavement, cables, electricity tunnels, covers, traffic lights, road lamps, lighting fixtures, electricity boxes, electric cords, cracks, rust, wet areas, welding exposure, concrete segregation, broken sensors, broken fire hoses, water leaks, loose wires, soot, missing equipment, loose screws, disintegration, waste, broken pavement, inflorescence, exposed iron, missing covers, graffiti, open holes, damaged suspension cables, potholes, or any combination thereof.

12. The system of claim 9, wherein positions of the findings depicted in said image found by matching a pattern in the image with positions of matching findings in images taken during maintenance and/or operations of said structure.

13. The system of claim 9, wherein the attributes of the findings comprise one or more of location, color, shape, size, texture, depth, width, height, area, impact distance from a source of the finding, quantity of elements within a particular radius, distance from a particular utility, distance from a past corrective action area, influence on core infrastructure, percentage of exposure, and physical connectivity to another finding.

14. The system of claim 9, wherein the vulnerability object comprises findings objects associated with findings from two or more functional groups of the structure.

15. The system of claim 14, wherein the functional groups comprise one or more of structural, electricity, air conditioning, a lifesaving system, an air quality system, a signing system, a fire detection system, and a fire mitigation system.

16. The system of claim 9, wherein the RACs are learned using a neural network technique.

17. The system of claim 9, wherein said images comprise photographs, thermal images, LIDAR images, or any combination thereof.

18. The system of claim 9, wherein said vulnerability group is grouped from relationships between attributes of findings in a single said image.

19. A system for detection of vulnerabilities due to cracks in a transportation infrastructure, comprising
   a. an images database, storing accumulated images of a structure, the images taken during routine maintenance of the structure, and the being multiple images taken at different times;
   b. an image processing module, configured to process the images;
   c. a findings processing module and an objects database comprising a findings sub-database of findings, wherein the multiple images being taken at different times enables development of a timeline history of attributes of each finding, the findings being groupings of elements and/or features of the structure, and a vulnerabilities sub-database, the findings processing module configured to
      i. detect findings comprising structural cracks in one or more of the images;
      ii. store new said detected findings as findings objects in the findings sub-database; and
      iii. compute attributes of said findings of each said findings object; and wherein the system further comprises
   d. a rules engine, configured to
      i. test relationships between said attributes of said findings against selection rules of one or more relationship-associative classifiers (RACs); each said RAC associated with a vulnerability of said structure or its systems;
      ii. group the findings objects with attributes meeting said RAC into a vulnerability grouping of said vulnerability; and
      iii. store vulnerability objects comprising the grouped findings objects or references thereto; and
   e. a reporting module, configured to report the vulnerability object and findings objects therein as said crack vulnerability to a maintenance entity;
      wherein said RACs group said cracks in a region in which all cracks are less than a critical distance from the nearest crack.

20. The system of claim 19, wherein said findings of the structure further comprise concrete or iron walls, bearings, deck, piers, abutments, traffic lane control sign, variable message sign, barriers, emergency telephone, signs, public announcements, cameras, safety, visibility sensors, $CO_2$ sensors, heat sensors, fire hoses, vents, doors, railings, pavement, cables, electricity tunnels, covers, traffic lights, road lamps, lighting fixtures, electricity boxes, electric cords, rust, wet areas, welding exposure, concrete segregation, broken sensors, broken fire hoses, water leaks, loose wires, soot, missing equipment, loose screws, disintegration, waste, broken pavement, inflorescence, exposed iron, missing covers, graffiti, open holes, damaged suspension cables, potholes, or any combination thereof.

* * * * *

UNITED STATES PATENT AND TRADEMARK OFFICE
CERTIFICATE OF CORRECTION

| | |
|---|---|
| PATENT NO. | : 11,605,158 B2 |
| APPLICATION NO. | : 17/045176 |
| DATED | : March 14, 2023 |
| INVENTOR(S) | : Saar Dickman et al. |

It is certified that error appears in the above-identified patent and that said Letters Patent is hereby corrected as shown below:

On the Title Page

Item (72) add inventor named Alon ORING, Gani-Tikva, ISRAEL.

Signed and Sealed this
Fourteenth Day of November, 2023

Katherine Kelly Vidal
*Director of the United States Patent and Trademark Office*